US006330685B1

(12) United States Patent
Hao et al.

(10) Patent No.: US 6,330,685 B1
(45) Date of Patent: Dec. 11, 2001

(54) NON-INVASIVE MECHANISM TO AUTOMATICALLY ENSURE 3D-GRAPHICAL CONSISTENCY AMONG PLURALITY APPLICATIONS

(76) Inventors: Ming C. Hao, 4150 Old Adobe Rd., Palo Alto, CA (US) 94306; Michael E. Goss, 181 Ada Ave., #23, Mountain View, CA (US) 94043; Joseph S. Sventek, 6923 Colton Blvd., Oakland, CA (US) 94611

(*) Notice: Subject to any disclaimer, the term of this patent is extended or adjusted under 35 U.S.C. 154(b) by 0 days.

(21) Appl. No.: 09/273,843

(22) Filed: Mar. 22, 1999

(51) Int. Cl.$^7$ ........................................... G06F 11/00
(52) U.S. Cl. ................................. 714/1; 707/100
(58) Field of Search .................. 714/1, 2, 5, 12, 714/39, 41, 42; 707/100, 62, 200; 709/107, 248, 247

(56) References Cited

U.S. PATENT DOCUMENTS

| | | | |
|---|---|---|---|
| 5,475,624 | * 12/1995 | West | 395/500.36 |
| 5,530,755 | * 6/1996 | Pailles et al. | 380/18 |
| 5,629,876 | * 5/1997 | Huang et al. | 395/500.18 |
| 5,652,794 | * 7/1997 | Lepetit et al. | 380/18 |
| 5,684,721 | * 11/1997 | Swoboda et al. | 364/578 |
| 5,715,433 | * 2/1998 | Raghavan et al. | 395/500.42 |
| 5,828,866 | 10/1998 | Hao | 395/500 |
| 5,893,077 | * 4/1999 | Griffin | 705/34 |
| 5,943,050 | * 8/1999 | Bullock et al. | 345/340 |
| 5,946,472 | * 8/1999 | Graves et al. | 395/500.44 |
| 5,963,641 | * 10/1999 | Crandall et al. | 380/2 |
| 6,006,022 | * 12/1999 | Rhim et al. | 395/500.02 |
| 6,032,268 | * 2/2000 | Swoboda et al. | 714/30 |
| 6,061,283 | * 5/2000 | Takahashi et al. | 365/201 |
| 6,123,735 | * 9/2000 | Raghavan et al. | 703/21 |
| 6,154,801 | * 11/2000 | Lowe et al. | 710/119 |
| 6,155,491 | * 12/2000 | Docker et al. | 235/486 |
| 6,199,068 | * 3/2001 | Carpenter | 707/100 |
| 6,223,272 | * 4/2001 | Coehlo et al. | 712/1 |

OTHER PUBLICATIONS

S.R. Ahuja, et al.; "A Comparison of Application Sharing Mechanisms in Real–Time Desktop Conferencing Systems"; Apr. 25, 1990; pp. 238–248.

William H. Press, et al.; "Numerical Recipes in C, The Art of Scientific Computing, Second Edition"; Chapter 20.3 Cyclic Redundancy and Other Checksums; 1992; pp. 896–901.

Keith A. Lantz; "An Experiment in Integrated Multimedia Conferencing"; pp. 267–275.

Thomas Gutekunst, et al.; "A Distributed and Policy–Free General–Purpose Shared Window System"; Feb., 1995; pp. 51–62.

Terrence Crowley, et al.; "MMConf: An Infrastructure for Building Shared Multmedia Applications "; Oct. 1990; pp. 329–342.

* cited by examiner

Primary Examiner—Nadeem Iqbal

(57) ABSTRACT

A system for and method of graphic consistency verification for a replicated network having a plurality of existing applications. The system includes a graphic consistency autochecker and a plurality of application encapsulators. One encapsulator is distributed to and operates with each application. Each encapsulator includes an event tracker, an image catcher, and a signature calculator. The method includes the steps of receiving and multicasting input events from the user of one of the applications, capturing a graphic image from each of the applications, calculating an image signature for each graphic image, comparing all image signatures for consistency, and correcting any discrepancy when at least one of the applications has an inconsistent image signature before executing the next input event.

14 Claims, 3 Drawing Sheets

NON-INVASIVE MECHANISM TO AUTOMATICALLY ENSURE 3D-GRAPHICAL CONSISTENCY AMONG PLURALITY APPLICATIONS

BACKGROUND OF THE INVENTION

1. Field of Invention

The present invention relates generally to computer-aided design/computer-aided manufacturing (CAD/CAM), multimedia, and any other system that supports substantially concurrent viewing and manipulation of electronically captured or generated images, graphics, or text by multiple users and, more particularly, to a graphical consistency verification system for real-time on-the-fly 3-D graphical consistency among multiple applications at different workstations.

2. Discussion of Related Art

Industries that manufacture motor vehicles, airplanes and other complex mechanical equipment require designers and engineers to work concurrently on the same large complex design. The ability to work concurrently on the same design allows multiple users to collaborate on design changes in real-time, thereby reducing overall design time and improving the quality of the final product design.

Computer systems allow designers and engineers to electronically generate and manipulate multidimensional design graphics. The computer software that electronically displays and manipulates graphics displayed on a computer screen is referred to generally as an application program or application. For more than one user to view or work on the same electronically generated graphics at the same time, the application must be shared with each user workstation site. The shared application should provide consistent views or windows of the same image in real-time at each user workstation.

Existing shared applications are based on two general architectures. First, a centralized architecture contains only one instance of the shared application. Inputs to the application are sent to a single execution site. The output of the application at the execution site is then sent to each user workstation display. The centralized architecture provides identical views by transmitting the same protocol to each user display. Second, a replicated architecture executes a copy of each shared application locally at each user workstation. User inputs and outputs to and from the shared application remain localized on the user workstation.

View consistency problems typically do not occur in centralized architectures since only one copy of the application is executed. However, centralized architectures must transfer all input and output (I/O) data between each user workstation and the shared application at the execution site. The I/O data increases network traffic between user workstations. Because networks have limited bandwidths, only a limited number of users can use a centralized shared application architecture concurrently.

Replicated architectures significantly reduce network traffic and have faster response times since I/O data remains localized at the user workstation. However, replicated architectures have difficulty maintaining an on-the-fly image with automatic image checking, among multiple copies of a displayed image at separate workstations. Workstations in a network need the ability to share and communicate contents of an image in multiple applications independent of available network bandwidth.

Accordingly, a need remains for improving real-time on-the-fly graphical images with automatic checking to ensure consistency in replicated architectures while improving response time and reducing data flow on the network.

SUMMARY OF THE INVENTION

The invention provides a graphical consistency verification system for a replicated architecture network providing capabilities of real-time on-the-fly verification. The system includes a graphic consistency autochecker on a central processor with multiple application encapsulators which cooperatively generate current graphic events and verify that the same graphic image is present among multiple existing applications on the remote processors. The invention checks a graphic image displayed or manipulated by the existing applications and verifies that the graphic image is consistent among the multiple existing applications using an image signature before executing subsequent input events.

The invention can be installed without relinking, or otherwise modifying existing applications on different workstations. The improved capability of graphic image replication and verification at workstations in a network can be used on a wide variety of existing design tools, for example computer aided design/computer aided manufacturing (CAD/CAM). The invention requires no special libraries, and obviates the need to compile and relink the existing application source code. The invention operates with unmodified existing applications. Thus, the invention is adaptable to any shared graphic or video multimedia application or real-time visual integration system, which can simultaneously install/update multiple copies of systems on remote sites (for example, update a password at all locations), and provide remote diagnostics with visual comparison. The graphic consistency autochecker can operate in systems with relatively small network bandwidth and can be enlarged to support a large number of users with minimal system modification.

The system includes multiple application encapsulators which encapsulate existing applications and automatically generate current graphic images at each workstation in the network and compare their respective calculated image signature to ensure graphic consistency before executing subsequent input events at each workstation. Each encapsulator includes an event tracker to process an input event (for example, a button or key press). The event tracker transmits the user-generated input events to the graphic consistency autochecker. A signature calculator, which is part of each encapsulator, calculates an image signature with minimum factors (for example, color) and transmits it to the autochecker. Each image signature from each encapsulator is compared in the graphic consistency autochecker to ensure graphic image consistency among multiple applications across the network. The graphic consistency autochecker performs global graphic verification based on the image signature transmitted from each encapsulator and ensures consistency among multiple unmodified applications at any execution instances in real-time.

The method of graphical consistency verification begins by initial processing of incoming input events from the event tracker (for example, button, keyboard, or other user specified input events). Then the autochecker requests that each application encapsulator send image signatures for comparison. The autochecker waits for all application encapsulators to send image signatures. When an application encapsulator receives the image signature request from the autochecker, each encapsulator: (a) generates a current graphic image; (b) calculates the image signature of the current graphic image; and (c) sends the generated image signature to the autochecker. After the autochecker receives the image signatures from all encapsulators, the autochecker performs a comparison of the image signatures. If there is inconsistency, the individual encapsulator is notified to correct the graphic image discrepancy. Finally, this process returns and starts the process again when initiated by another input event.

One advantage of the invention is a system and method that automatically in real-time ensures 3-D graphical consistency among multiple graphic applications by detecting inconsistent graphic image information using an image signature. If an inconsistency exists, an interruption occurs of workstation collaboration until consistency is established. Another advantage of the invention is remote site engineering design diagnostic applications. In either application, users in an engineering design network can share consistent graphic image or text information among multiple applications. Other advantages of the invention include: obviating the need to change existing window applications; ensuring consistent views for real-time sharing of 3-dimensional modeling using CAD/CAM applications; requiring low network bandwidth; and being heterogeneous and portable to all window systems.

BRIEF DESCRIPTION OF THE DRAWING

The foregoing and other objects, features and advantages of the invention will become more readily apparent from the following detailed description of a preferred embodiment of the invention, when read in conjunction with the accompanying drawing, wherein.

DETAILED DESCRIPTION OF THE PREFERRED EMBODIMENTS

Figure 1:
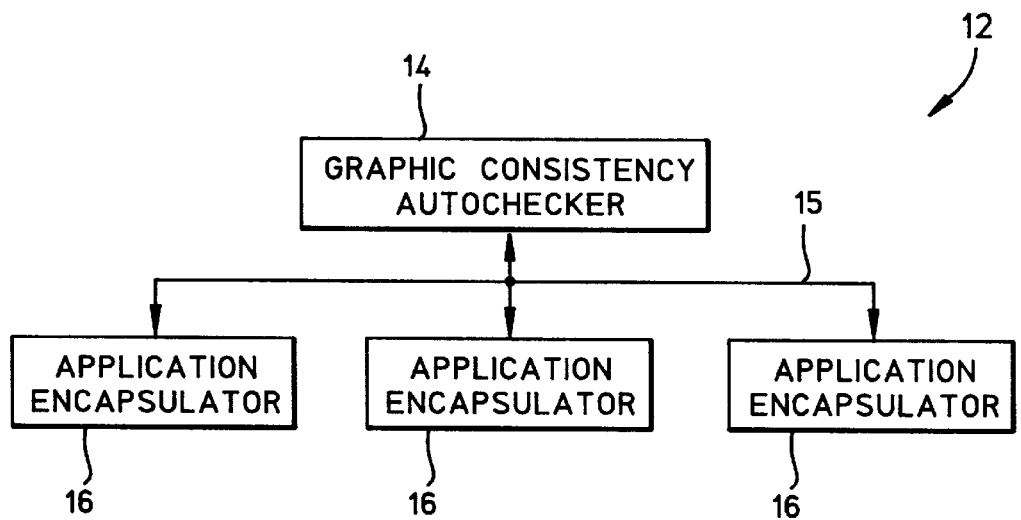
FIG. 1 is a block diagram of a graphical consistency verification system for a replicated architecture network according to the present invention.

Referring first to FIG. 1, a block diagram of a graphical consistency verification system 12 for a replicated architecture network according to the present invention is shown. The system 12 includes a graphic consistency autochecker 14 for automatic graphical consistency among multiple applications running in real-time during a concurrent collaboration session. Multiple application encapsulators 16 are loaded onto platforms such as workstations. Each workstation includes CAD/CAM applications, multimedia applications or any other existing applications where it is desirable to display multiple replicated views in real-time. The sites where the application encapsulators and the autochecker reside are typically connected together through a network 15 such as a local area network (LAN). A preferred use of the invention is sharing 3D-drawings that are rotated and modeled among multiple sites and also at remote diagnostic workstations. One of ordinary skill in the art will realize that the system 12 may be embodied as hardware, software, or a combination of both as desired.

The graphic consistency autochecker 14 communicates with the application encapsulators 16 to synchronize and simultaneously execute input events through the existing replicated applications on each user platform. For reference purposes, the particular application encapsulator that receives the input event will be designated the floor holder and all of the other encapsulators will be designated as participants. Which encapsulator is designated the floor holder will change depending on which encapsulator receives future input events. The graphic consistency autochecker receives one or more input event from the floor holder encapsulator and multicasts the event to each of the participant encapsulators. The encapsulators transmit an image signature from a signature calculator upon request by the autochecker. If the autochecker detects inconsistency of the image signature in one of the encapsulators, the system 12 automatically stops collaboration and corrects the discrepancy.

Figure 2:
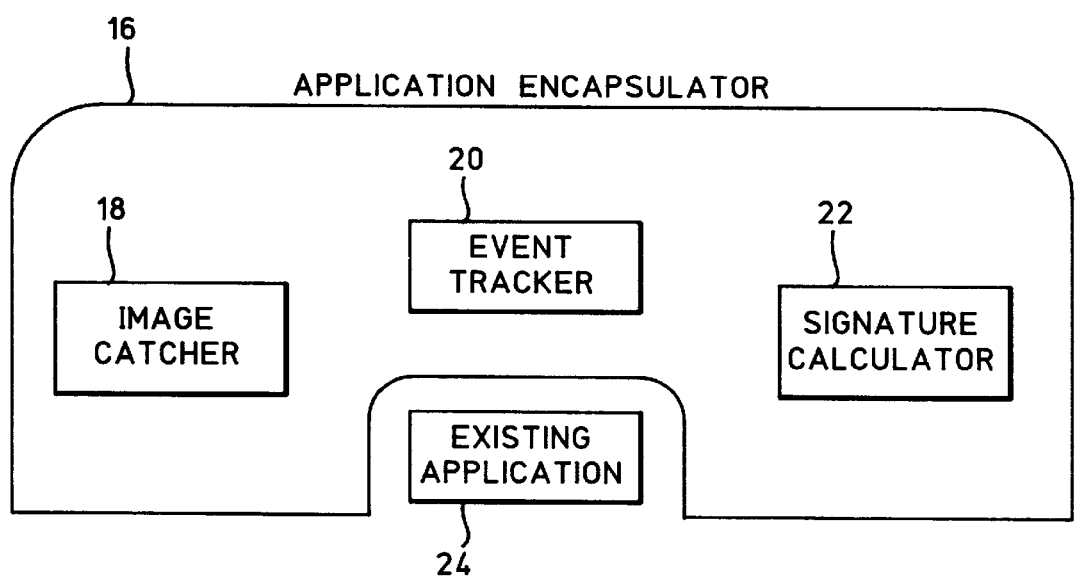
FIG. 2 is a detailed block diagram of an application encapsulator of FIG. 1.

Referring now to FIG. 2, a detailed block diagram of an application encapsulator 16 of FIG. 1 is shown. The encapsulator 16 receives button, keyboard, or other user specified input events communicated to an existing application 24 loaded on the local user workstations. The application encapsulator 16 receives and transmits data in the format and protocol used by the existing application 24. Thus, the encapsulator 16 can operate in conjunction with the existing application without recompiling, relinking or modifying the existing application program.

Each application encapsulator 16 includes: an event tracker 20 that notifies the graphic consistency autochecker 14 of FIG. 1 of input events; a graphic image catcher 18 that generates a current application graphic image existing on the particular encapsulator; and a signature calculator 22 that determines an image signature encompassing aspects of the application graphic image that is sent to the autochecker to verify consistency of graphical images among multiple applications across the network 15 of FIG. 1.

The graphic consistency autochecker 14 ensures that all copies of the existing application 24 are synchronized by ensuring that each user sees an equivalent graphical image on their display screen. Consistent graphic image comparison of each of the applications is done by comparing an image signature from each of the multiple encapsulators rather than comparing their respective complete graphic image contents. Frequent complete graphic image content transmission and analysis from each user would require much higher system bandwidth. The invention obviates this problem by implementing an image signature used by the autochecker. Moreover, the image signature concept provides system security by obviating the need to transmit complete graphic image content over a network where interception is a potential security risk.

Each application encapsulator 16 has a signature calculator 22 which computes a small image signature locally and subsequently transmits the image signature of that encapsulator to the graphic consistency autochecker 14 upon request. The image signature is characterized by being computed from: a) relevant screen areas, and excludes irrelevant areas (window borders, blank spaces, etc.); b) a derived graphic image from which irrelevant information (such as specific color choices) have been filtered out (this filtering is easily done, using standard graphic image processing operations); and c) a graphic image with resolvable fine detail content. The image signature size is much smaller than the total graphic image size. Any image signature generation technique having these characteristics may be used. An example of an efficient technique is cyclic redundancy check (CRC). This technique using an N-bit CRC can detect differences which occur in N or fewer adjacent bits, and only has one chance in two-to-the Nth power of failing to detect any one bit random difference. See W. H. Press et al., "Cyclic Redundancy and Other Checksums" Numerical Recipes in C: The Art of Scientific Computing," 2nd ed., Cambridge University Press, pages 896–901 (1995). As an example, a 32-bit CRC would fail to detect only one out of 4,294,967,296 random differences. For even greater assurance that no differences occur, a higher-precision CRC can be used. Other techniques which may be desirable in some applications include cryptographic-strength hash functions and cryptographic signature techniques. See B. Schneier, "Applied Cryptography," Wiley & Sons (1994).

Figure 3:
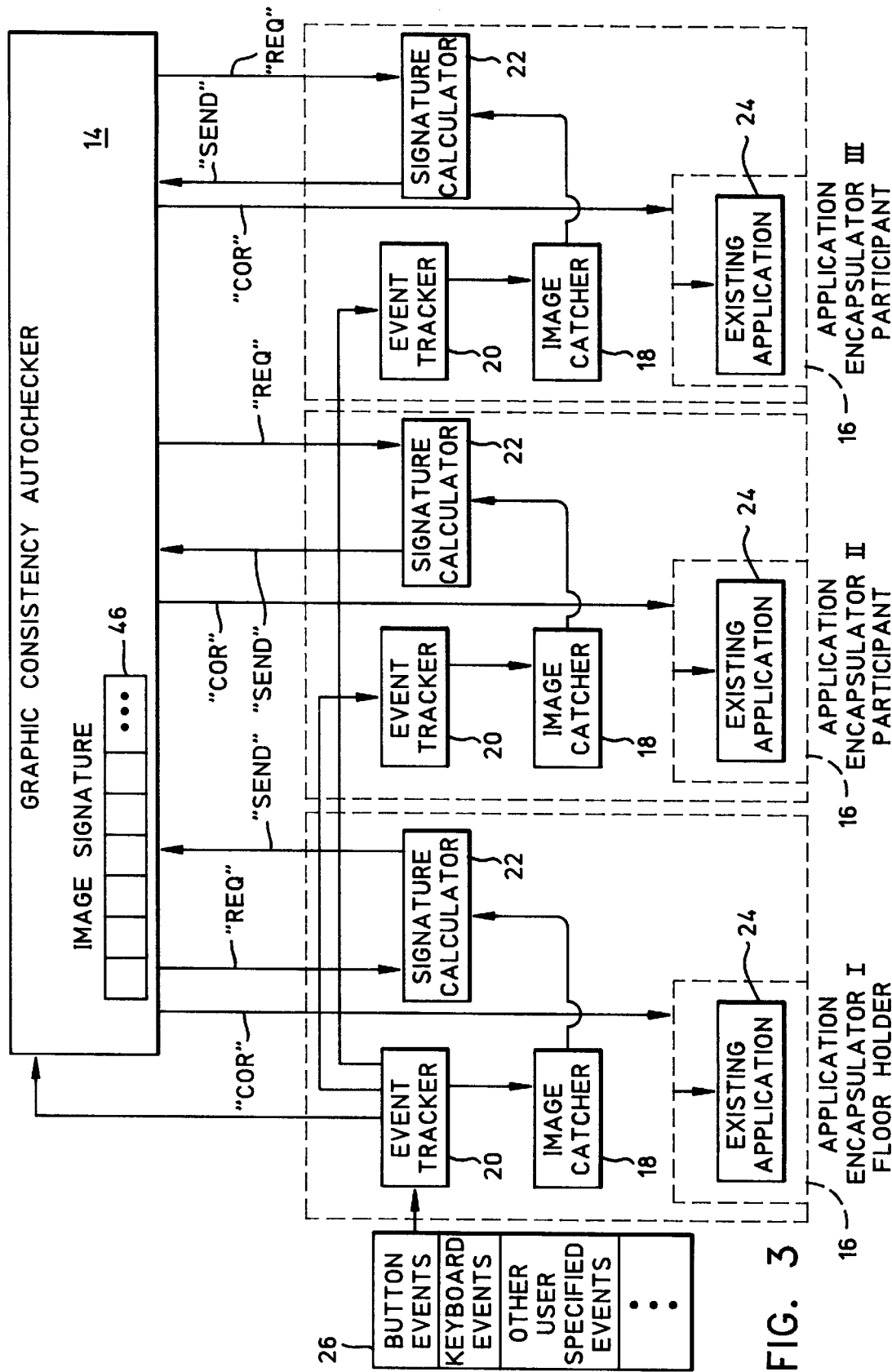
FIG. 3 is a detailed block diagram of the graphical consistency verification system for the replicated architecture network of FIG. 1.
Figure 4:
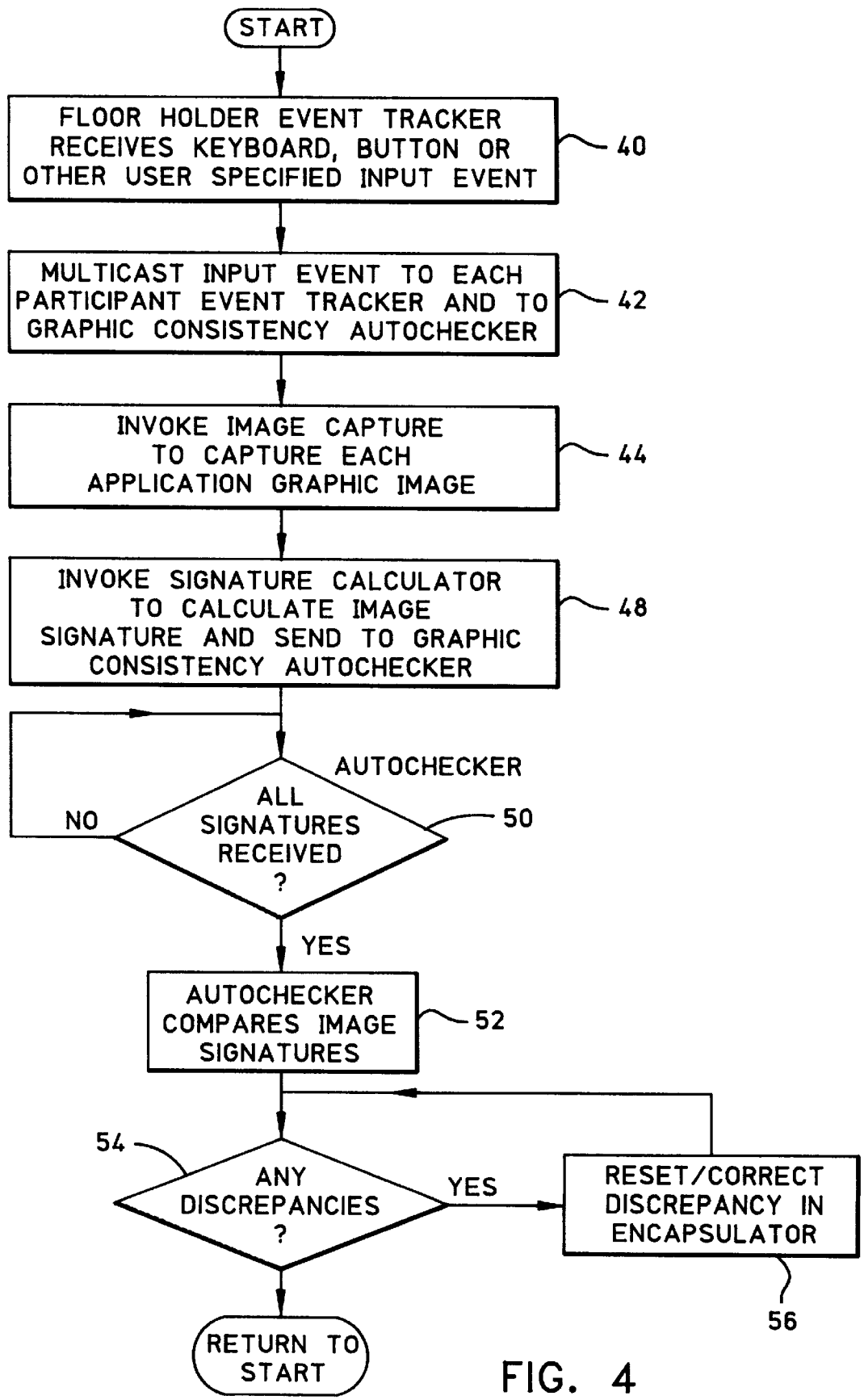
FIG. 4 is a flow diagram of the processing of input events demonstrating the cooperative operations performed by the graphic consistency autochecker with each of the encapsulators of the present invention.

Referring now to FIG. 3, a detailed block diagram of the graphical consistency verification system for the replicated architecture network of FIG. 1 is shown. Each application encapsulator 16 includes an image catcher 18 that generates a current application graphic image performed by each encapsulator. One or more button, keyboard, or other user specified input events 26, such as from a button or key, are generated from one of the user workstations and communicated to the event tracker 20 of the floor holder encapsulator. The event tracker then transmits the one or more input events 26 to the graphic consistency autochecker 14 and the other participant encapsulators. The autochecker sends a request by a "REQ" signal to the signature calculator 22 for conducting graphic image consistency checking of each encapsulator. The calculator replies by a "SEND" signal containing the image signature 46. The autochecker monitors the event tracker in each encapsulator before executing the next input event. The autochecker 14 automatically compares image signatures 46 from each signature calculator 22. If the autochecker gets equal comparison of each of the image signatures 46, a user can continue modifying the design with additional input events 26. If the autochecker gets an unequal comparison, the autochecker transmits a correction by a "COR" signal to the inconsistent encapsulator and processing is stopped until the either the inconsistent encapsulator resets the graphical image or discontinues collaboration with other encapsulators, Referring now to FIG. 4, a flow diagram of the processing of input events 26 demonstrating the concurrent operations performed by the graphic consistency autochecker 14 with each of the encapsulators 16 of the present invention is shown. The process begins at START. In step 40, the floor holder event tracker 20 receives button, keyboard, or other user specified input events 26 from a user workstation (for example, a button or key press). In step 42, the event tracker 20 multicasts the single input event or group of input events to each participant event tracker and to the graphic consistency autochecker 14 over the network 15. In step 44, each application encapsulator generates the current graphic image via the image catcher 18. Next, in step 48, the graphic consistency autochecker requests by a "REQ" signal that each application encapsulator calculate the image signature 46 in the signature calculator 22 and then transmit the image signature by a "SEND" signal to the autochecker. In step 50, the autochecker waits for all application encapsulators to send image signatures. After the autochecker receives all image signatures, the autochecker performs an image signature comparison in step 52. If there is an inconsistency (step 54) in any one of the image signatures, the user is notified by a "COR" signal (step 56) to reset or correct the graphic image discrepancy. Then, processing returns to START to wait until the next input button, keyboard, or user specified input event occurs.

The invention taught herein supports virtual co-location strategies by ensuring graphic consistency before processing the next incoming event of a graphic image. The invention automatically ensures 2-D or 3-D graphical replication among multiple applications across a network. The invention can also be used additionally with text applications alone or with 3-D CAD/CAM applications for current updated design information in the system. The invention can also be used with multiple replicated displays from word processor applications that may be synchronized at two different workstations at the same time.

Having described and illustrated the principles of the invention in a preferred embodiment thereof, it should be apparent that the invention can be modified in arrangement and detail without departing from such principles. We claim all modifications and variations coming within the spirit and scope of the accompanying claims and equivalents thereof.

What is claimed is:

1. A graphical consistency verification system for a replicated architecture network having a plurality of existing applications, the system comprising:

a plurality of application encapsulators wherein one of the plurality of application encapsulators is distributed to each of the plurality of existing applications; and a graphic consistency autochecker whereby an image signature is received from each of the plurality of application encapsulators upon the occurrence of input events;

wherein each of the plurality of application encapsulators operates with one of the plurality of existing applications and is controlled by the graphic consistency autochecker according to comparisons of the image signatures.

2. The system according to claim 1, wherein each of the plurality of application encapsulators comprises an event tracker that monitors for input events and transmits the same to the graphic consistency autochecker.

3. The system according to claim 1, wherein each of the plurality of application encapsulators comprises an image catcher that generates and interprets an application graphic image existing in the encapsulator.

4. The system according to claim 1, wherein each of the plurality of application encapsulators comprises a signature calculator for calculating the image signature, wherein the signature calculator communicates with the graphic consistency autochecker which assures graphic consistency among the plurality of existing applications.

5. The system according to claim 4, wherein the graphic consistency autochecker comprises means for generating a request image signature signal transmitted to the signature calculator.

6. The system according to claim 5, wherein each of the plurality of application encapsulators comprises means for transmitting a send image signature signal to the graphic consistency autochecker.

7. The system according to claim 1, wherein each of the plurality of existing applications comprises multi-dimensional display programs and wherein the graphic consistency autochecker and the plurality of application encapsulators communicate and transfer input events independently of the multi-dimensional display programs.

8. The system according to claim 1, wherein at least two of the plurality of application encapsulators and the associated existing applications are loaded on workstations located in different physical locations and the graphic consistency autochecker is located at a third location accessible from each workstation through a network.

9. The system according to claim 1, wherein the graphic consistency autochecker comprises means for performing cyclic redundancy checks of the image signatures.

10. A method of graphical consistency verification for a replicated architecture network having a plurality of existing applications, the method comprising the steps of:

receiving input events from the user of one of the plurality of existing applications;

multicasting the input events;

capturing a graphic image from each of the plurality of existing applications;

calculating an image signature for each graphic image;

comparing all image signatures for consistency before executing a next input events; and correcting any discrepancy when at least one of the plurality of existing applications has an inconsistent image signature.

11. A graphical consistency verification system for a replicated architecture network having a plurality of existing applications, the system comprising:

means for receiving input events from the user of one of the plurality of existing applications;

means for multicasting the input events;

means for capturing a graphic image from each of the plurality of existing applications;

means for calculating an image signature for each graphic image;

means for comparing all image signatures for consistency before executing a next input events; and means for correcting any discrepancy when at least one of the plurality of existing applications has an inconsistent image signature.

12. The system according to claim 11, wherein the means for calculating an image signature employs a cyclic redundancy check.

13. The system according to claim 11, wherein the means for calculating an image signature employs a cryptographic-strength hash function.

14. The system according to claim 11, wherein the means for calculating an image signature employs a cryptographic signature technique.

* * * * *